(12) United States Patent
Guyon et al.

(10) Patent No.: US 11,540,660 B2
(45) Date of Patent: Jan. 3, 2023

(54) BEVERAGE MACHINE WITH ERGONOMIC HANDLING

(71) Applicant: NESTEC S.A., Vevey (CH)

(72) Inventors: Bertrand Guyon, Saint Point Lac (FR); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 301 days.

(21) Appl. No.: 16/328,769

(22) PCT Filed: Sep. 1, 2017

(86) PCT No.: PCT/EP2017/071969
§ 371 (c)(1),
(2) Date: Feb. 27, 2019

(87) PCT Pub. No.: WO2018/046400
PCT Pub. Date: Mar. 15, 2018

(65) Prior Publication Data
US 2019/0191916 A1 Jun. 27, 2019

(30) Foreign Application Priority Data
Sep. 9, 2016 (EP) .................................... 16188069

(51) Int. Cl.
*A47J 31/36* (2006.01)
*A47J 31/52* (2006.01)
*A47J 31/40* (2006.01)
(52) U.S. Cl.
CPC ....... *A47J 31/3633* (2013.01); *A47J 31/3604* (2013.01); *A47J 31/407* (2013.01); *A47J 31/52* (2013.01); *A47J 31/521* (2018.08)
(58) Field of Classification Search
None
See application file for complete search history.

(56) References Cited

U.S. PATENT DOCUMENTS 8,443,718 B2 5/2013 Denisart et al.
9,351,600 B2 5/2016 Rime
(Continued)

FOREIGN PATENT DOCUMENTS

CN 105263375 A * 1/2016 ............ A47J 31/469
ES 2564034 T3 * 3/2016 .......... A47J 31/3695
(Continued)

OTHER PUBLICATIONS

Machine translation of CN 105263375 A performed on Jan. 4, 2022, Hanneson et al. (Year: 2016).*
(Continued)

*Primary Examiner* — Brian W Jennison
*Assistant Examiner* — Kevin Guanhua Wen
(74) *Attorney, Agent, or Firm* — K&L Gates LLP (57) ABSTRACT

A machine (1) for preparing and dispensing a beverage (2) has: a capsule extraction unit (10) having a first part (11) and a second part (12) that are relatively movable between a distant position for inserting a capsule (3) and a close position for extracting such capsule (3); a control unit (40) for controlling the extraction unit (10) to extract such capsule (3); an outlet (20) for dispensing said beverage (2) formed by extracting such capsule (3) to a user-receptacle (4) located in a receptacle placing area; and a detection arrangement (30) connected to the control unit (40) for detecting the presence of such receptacle (4) in the placing area. The unit (10) has an actuator (13) configured to relatively move the first and second parts (11, 12) between their distant and close positions. The actuator (13) is controlled by the control unit (40) to relatively move the first and the second parts (11, 12) when the detecting arrangement (30) detects the presence of said receptacle (4) in the receptacle placing area.

16 Claims, 7 Drawing Sheets

(56) References Cited

U.S. PATENT DOCUMENTS

| | | |
|---|---|---|
| 9,351,604 B2 | 5/2016 | Talon et al. |
| 9,980,597 B2 | 5/2018 | Mori et al. |
| 10,849,456 B2 | 12/2020 | Branko |
| 2012/0305111 A1 | 12/2012 | Peretti et al. |
| 2013/0247771 A1 | 9/2013 | Maisch |
| 2015/0040771 A1 | 2/2015 | Mori et al. |
| 2015/0135962 A1 | 5/2015 | Jarisch et al. |

FOREIGN PATENT DOCUMENTS

| | | | |
|---|---|---|---|
| WO | 2012025259 | 3/2012 | |
| WO | 2012093107 | 7/2012 | |
| WO | WO 2013042042 A1 * | 3/2013 | ............. A47J 31/36 |
| WO | 2014056642 | 4/2014 | |
| WO | WO 2015148089 A1 * | 10/2015 | ............. A47J 31/52 |
| WO | WO 2015173285 A1 * | 11/2015 | ............. G06K 19/06 |
| WO | 2016005417 | 1/2016 | |
| WO | WO 2016005417 A1 * | 1/2016 | ............. A47J 31/36 |
| WO | WO 2016026928 A1 * | 2/2016 | ............. A47J 31/36 |

OTHER PUBLICATIONS

Machine translation of ES 2564034 T3 performed on Jan. 4, 2022, Talon et al. (Year: 2016).*

* cited by examiner

BEVERAGE MACHINE WITH ERGONOMIC HANDLING

CROSS REFERENCE TO RELATED APPLICATIONS

The present application is a National Stage of International Application No. PCT/EP2017/071969, filed on Sep. 1, 2017, which claims priority to European Application No. 16188069.5, filed on Sep. 9, 2016, the entire contents of which are being incorporated herein by reference.

FIELD OF THE INVENTION

The field of the invention pertains to beverage preparation machines provided with an ergonomic handling, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO 2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO2011/144719, EP2014195046, EP2014195048 and EP2014195067.

The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. Alternative covers for a capsule insertion passage are disclosed WO 2012/093107 and WO 2013/127906. Different motorization systems are disclosed in WO 2012/025258, WO 2012/025259 and WO 2013/127476.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2010/003932, WO 2011/144720 and WO 2012/032019. To facilitate the operating of the machine, it is possible to identify automatically the capsule supplied to the machine and then handle and extract the capsule automatically, as for instance disclosed in WO 2012/123440.

There is still a need to improve the beverage dispensing with machines that identify and handle capsules automatically.

SUMMARY OF THE INVENTION

The invention relates to a machine for preparing a beverage. The beverage preparation machine can be an in-home or out of home machine.

The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has a unit for extracting a beverage ingredient capsule to form the beverage. The unit has a first part and a second part that are relatively movable between a distant position for inserting and/or removing a capsule and a close position for securing and extracting such capsule. In the close position the first and second parts typically delimit an extraction chamber.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with a direction of relative movement of the first and second parts. The extraction chamber is then delimited on one side by such cavity.

The other part of these first and second parts may be delimited by another cavity or include an extraction plate, such as a plate provided with piercing elements for opening a flow-through face of the capsule or a non-intrusive plate for cooperating with a pre-opened or a self-opening flow-through face of the capsule.

Examples of extraction chambers are disclosed in in WO 2008/037642 and WO 2013/026843.

At least one of these parts can have a capsule opener e.g. one or more capsule piercers.

The capsule can also include a self-opening mechanism. Self-opening capsules are for instance disclosed in CH 605 293 and WO 03/059778.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

At least one of the parts may have an opening for an inflow of liquid to be mixed with an ingredient contained in such capsule.

The machine includes a control unit for controlling the extracting unit to extract such capsule. The control unit can be powered by the mains e.g. via an electric cord.

The machine has an outlet for dispensing the beverage formed by extracting such capsule to a user-receptacle, such as a cup or a mug, located in a receptacle placing area.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts or to a longitudinal or central direction of the extraction.

For instance, the user receptacle can be placed on a receptacle support to collect the beverage.

The receptacle support can be formed by an external placement support on which such machine is located.

The receptacle support may be formed by a support comprised by the machine, e.g. a movable or removable machine support.

The receptacle placing area can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet. Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, WO 2016/096705, WO 2016/096706 and WO 2016/096707.

The outlet can be fixed to or formed by or mounted to or mounted in:
a machine head that has a deployed position in which the outlet is located above the receptacle placing area and a collapsed position in which the outlet is retracted within an external machine main housing, such as a machine head driven inwards into and outwards out of the main housing by at least one of the first and second parts or by an actuator controlled by the control unit; and/or
a movable beverage guide that has a beverage dispensing configuration to dispense beverage to the receptacle placing area and a beverage stop configuration to prevent dispensing of beverage to the receptacle placing area, e.g. by draining residual beverage from the guide over a guide edge to a waste receptacle, such as a beverage guide driven between the dispensing configuration and the stop configuration by at least one of the first and second parts or by a (or the above) machine head or by an actuator controlled by the control unit.

For instance, the machine is provided with a machine head as disclosed in PCT/US15/048691 and PCT/US15/048693.

Examples of suitable waste receptacles for carrying out the present invention are disclosed in EP 1867260, WO 2009/074559, WO 2009/135869, WO 2010/128109, WO 2011/086087, WO 2011/086088, PCT/US16/12647 and EP2016158200.2.

The directing fluid guide can be entirely confined in the main body and/or the machine head.

Details of directing fluid guides that are suitable or adaptable for carrying out the present invention are disclosed in WO 2006/050769, WO 2012/072758, WO 2013/127907, WO 2016/083488 and PCT/US15/048691.

The machine has a detection arrangement for detecting the presence of such receptacle in the receptacle placing area. The detecting arrangement is connected to the control unit. For instance, the detecting arrangement includes a magnetic, electromagnetic, optical sensor (e.g. camera) or weight sensor.

The extracting unit includes an actuator configured to relatively move the first and second parts between their relatively distant position and their relatively close position.

The actuator is connected to the control unit and controlled thereby to relatively move the first and the second parts when the detecting arrangement detects the presence of a receptacle in the receptacle placing area.

Hence, an automatic operation of the first and the second parts into the distant position for preparing a beverage preparation is conditioned by the detection of a receptacle in the receptacle placing area. Consequently, beverage will not be dispensed inadvertently to the receptacle placing area in the absence of a receptacle in the receptacle placing area. Moreover, a capsule will not even be inadvertently accepted into the extraction chamber when no receptacle is placed in the receptacle placing area for collecting beverage. Hence, there is no risk of inadvertent insertion of a capsule into the extraction chamber and inconvenient retrieval thereof when it should not be extracted, especially in case the capsule is automatically opened, e.g. pierced, when in the capsule chamber or entering the capsule chamber.

Optionally, the control unit is further connected to an input device, which when activated, overrides or completes a control of the extracting unit based on the detecting arrangement. The input device may include a user-interface (e.g. as disclosed in PCT/US15/048693) and/or a capsule sensor for sensing a capsule ready to be inserted into the extracting unit. Hence, the input device may be used to relatively move the first and second parts in the absence of a receptacle or to relatively move again in an anticipated manner the first and second parts in spite of the detection of a receptacle. Details of suitable capsule sensing and sensors are disclosed in WO 2012/123440, WO 2014/147128, WO 2015/173285, WO 2015/173289, WO 2015/173292, WO 2016/005352 and WO 2016/005417.

The extraction unit can include a capsule feeder for feeding a capsule to the extraction chamber, the feeder having a capsule dispenser with a release configuration for releasing such capsule from the feeder towards the extraction chamber and a retain configuration for retaining such capsule away from the extraction chamber.

The capsule dispenser can be formed by a mechanical and/or magnetic capsule gate such as a capsule holder e.g. having a shape complementary to and matching at least part of an outer shape of such capsule.

The capsule holder may have a capsule gate that is movable, such as pivotable and/or translatable, between a position obstructing a transfer towards the extraction chamber and a position clearing the transfer towards the extraction chamber.

The capsule holder may have an actuator for passing from the retain configuration to the release configuration and vice versa, such as an actuator controlled by the control unit.

Immediately after releasing a capsule towards the extraction, the capsule dispenser may be passed from the release configuration to the retain configuration so that access towards the extraction chamber is only provided when needed to release a capsule.

Details of suitable capsule dispensers are disclosed in WO 2012/126971, WO 2014/056641, WO 2014/056642 and WO 2015/086371.

The capsule feeder may include a passage for guiding such capsule to the extraction chamber into a predetermined capsule orientation for its entry into the extraction chamber such as a passage associated with capsule immobilizer for immobilizing such capsule between the first and second parts in their distant position prior to relatively moving them into their close position.

The interaction between the first and second parts (and optionally the capsule guiding passage) and an ingredient capsule may be of the type disclosed in WO 2005/004683, WO 2007/135135, WO 2007/135136, WO 2008/037642 and WO 2013/026856.

The control unit may control the capsule dispenser to release such capsule from the feeder when the first and second parts are in the distant position or moving towards the distant position, for an entry of such capsule into the extraction chamber when the first and second parts are brought back into their close position.

The control unit may control the capsule dispenser to retain such capsule at the feeder and away from the extraction chamber when the first and second parts are:
  in the close position or relatively moving thereto; or
  in the distant position and about to relatively move to the close position so as to leave insufficient time for such capsule, if it were released from the dispenser, to be received into the extraction chamber prior to the first and second parts reaching the close position.

The capsule feeder may include or be associated with a capsule sensor connected to the control unit, the control unit being configured to bring or maintain the capsule dispenser in its retain configuration when the capsule sensor senses no such capsule on or at the capsule dispenser. Examples of suitable capsule sensors are indicated above.

The control unit can be configured to control the actuator so that the first and second parts are moved by the actuator: from the close position into the distant position when the detection arrangement detects a placement of a receptacle into the receptacle placing area; and from the distant position into the close position after a predetermined period of time starting from detecting the placement of such receptacle or from reaching the distant position has lapsed, for instance a predetermined period of time in the range of 3 to 15 sec, such as 5 to 12 sec, e.g. 7 to 10 sec.

Examples of such parts that are relatively moved by an actuator (e.g. a motor) are disclosed in EP 1767129, WO 2012/025258, WO 2012/025259, WO 2013/127476 and WO 2014/056641.

For instance, the first part and the second part are relatively movable generally along a straight axis by the actuator from the close to the distant positions and/or vice versa.

The unit may include a liquid supplier for supplying liquid, e.g. water, into the extraction chamber, the liquid supplier being connected to and controlled by the control unit to supply such liquid into the extraction chamber and to interrupt such supply, automatically and/or manually via a user-interface connected to the control unit and/or when a removal of such receptacle is detected by the detecting arrangement. For instance, the liquid supplier includes one or more of: a source of said liquid, such as a liquid tank or a liquid connector for connection to an external liquid provider; one or more liquid tubes for guiding such liquid to the extraction chamber; a liquid driver, such as a pump e.g. a solenoid pump (reciprocating piston pump) or a peristaltic pump or a diaphragm pump, for driving such liquid into extraction chamber; and a thermal conditioner, e.g. a heater and/or a cooler, such as an inline thermal conditioner, e.g. an inline flow conditioner, for thermally conditioning such liquid.

Examples of suitable liquid sources, e.g. tanks or connectors, are disclosed in WO 2016/005349, EP2015194020.2, PCT/US16/12647 and the references cited therein.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The control unit may be configured to control the liquid supplier to supply automatically the liquid into the extraction chamber when:
  the first and second parts have reached their close position with the capsule housed in the extraction chamber upon moving the parts from the distant to the close positions so as to combine said liquid with an ingredient contained in the capsule and form the beverage for dispensing via the outlet, optionally after sensing with a (or the above) capsule sensor a supply of such capsule to the unit; and/or
  the first and second parts have reached their close position without any capsule housed in the extraction chamber so as to rinse or clean at least part of the unit and optionally the outlet, the liquid supplier being for instance configured to supply the liquid at a rinsing or cleaning temperature that is different to the temperature of such liquid for forming a beverage, e.g. by brewing.

In a particular embodiment, it is also contemplated to deliver cold or cooled beverages.

The control unit can be configured to control the liquid supplier not to supply automatically the liquid into the extraction chamber when the first and second parts have reached their close position without any (for instance detected or recognised) capsule housed in the extraction chamber. For instance, the control unit is configured to control the liquid supplier to supply the liquid into the extraction chamber upon sensing a corresponding manual user-input on a user-interface connected to the control unit.

The machine may include a (or the above) capsule sensor connected to the control unit and configured for sensing a type of a capsule fed to the extraction chamber, the control unit being configured to control the liquid supplier according to a liquid supply program associated with the sensed type, such as a liquid supply program with one or more adjusted supplied liquid parameters selected from a liquid temperature, flow, pressure and volume that is/are constant or variable during an extraction of said capsule. For instance, the type is selected from a plurality of capsule types extractible in the extraction chamber and associated with a type-dedicated identifier stored in an internal or external data storage means connected or connectable with the control unit.

The control unit may have an end-of-extraction management program which is run automatically when the liquid supply is interrupted (e.g. when a predetermined extraction process is over or is detected as faulty) to:
- immediately relatively move the first and second parts into their distant position so as to remove any capsule from inbetween the first and second parts; or
- to maintain the first and second parts in the close position during a predetermined period of time, e.g. in the range of 1 to 5 sec such as 2 to 3 sec, for allowing a manual request, e.g. via a user-interface connected to the control unit, to supply via the liquid supplier an additional amount of liquid into the extraction chamber and, in the absence of such manual request during the predetermined period of time, to relatively move the first and second parts into their distant position so as to remove any capsule from inbetween the first and second parts, for instance to remove such capsule into a used-capsule collector formed by a (or the above) waste receptacle.

For instance, prior to moving the first and second parts into their close position, the parts may remain into their distant position for a predetermined period of time, such as a period of time in the range of 1 to 6 sec. e.g. 2 to 4 sec, for allowing an insertion of a new capsule inbetween the first and second parts prior to relatively moving them into their close position with the new capsule housed in the extraction chamber for an extraction of the new capsule.

Hence, a user can request the dispensing of two (or more) portions of beverages (e.g. a double expresso) into the same user-recipient.

The control unit can be connected to at least one component, e.g. the receptacle detecting arrangement and/or a (or the above) capsule sensor, in the machine by a wireless connection. The component can be assembled or fixed to a movable or removable part of the machine such as: a (or the above) capsule gate; or the first or the second part; or a removable service unit, such as a service unit having a used capsule collector and/or a (or the above) liquid tank. The wireless connection can be an optic, radio or phonic connection, e.g. a wifi connection. The wireless connection can be used for data-transmission and/or power transmission.

The invention also relates to a combination of a machine as described above and a capsule, e.g. such capsule being in the machine's extraction chamber or such capsule being handled by the capsule feeder as described above.

Another aspect of the invention relates to a method of preparing and dispensing a beverage from a capsule in a machine as described above. The method includes the steps of: placing a receptacle in the receptacle placing area and detecting the receptacle by the detection arrangement; relatively moving the first and second parts into their distant position automatically as a result of detecting the receptacle; supplying the capsule to the extracting unit; relatively moving the first and second parts into their close position to position the capsule in the extraction chamber; extracting the capsule in the extraction chamber to prepare the beverage; and dispensing the prepared beverage via the outlet to the receptacle.

A further aspect of the invention relates to a use of a capsule for: a machine as described above; forming a combination as described above; or carrying out a method as described above. Such capsule is positioned in the extraction chamber by relatively moving the first and second parts into their close position after the first and second parts have been moved into their distant position automatically upon detection by the detection arrangement of a receptacle in the receptacle placing area.

BRIEF DESCRIPTION OF THE DRAWINGS

The invention will now be described with reference to the schematic drawings, wherein.

DETAILED DESCRIPTION

FIGS. 1 to 11 illustrate an exemplary embodiment of a beverage machine 1 for preparing and dispensing a beverage 2, such as tea, coffee, hot chocolate, cold chocolate, milk, soup or baby food, in accordance with the invention. The ingredient may be supplied in the form of an ingredient capsule 3, e.g. of the type described above under the header "Field of the Invention".

The sequence from FIGS. 1 to 8b illustrates a beverage preparation sequence in machine 1 from the supply of an ingredient capsule 3 to the removal of capsule 3 upon beverage preparation. FIGS. 9 to 11 illustrate the interaction between machine 1 and a user-receptacle 4 during which a capsule 3 is brought too late to machine 1 for being extracted.

Machine 1 includes a unit 10 for extracting beverage ingredient capsule 3 to form beverage 2. Unit 10 has a first part 11 and a second part 12 that are relatively movable between a distant position for inserting and/or removing capsule 3 and a close position, such as a close position in which first and second parts 11,12 delimit an extraction chamber 10', for securing and extracting such capsule 3. For instance, at least one of parts 11,12 has a capsule opener e.g. one or more capsule piercers and/or at least one of said parts 11,12 has an opening for an inflow of liquid to be mixed with an ingredient contained in such capsule 3.

Machine 1 includes a control unit 40 (FIG. 2) for controlling extracting unit 10 to extract capsule 3. Control unit 40 may be powered by the mains (e.g. via an electric cord 45) or by a DC source (e.g. battery such as a car battery or portable battery or machine battery).

Machine has an outlet 20 for dispensing beverage 2 formed by extracting such capsule 3 to a user-receptacle 4, such as a cup or a mug, located in a receptacle placing area to collect beverage 2. Such area may be on a receptacle support 5,6 e.g. an external placement support 5 on which such machine 1 is located or a machine support 6 e.g. a movable or removable machine support 6, e.g. a machine support 6 that is located on or above an external placement support 5.

Outlet 20 can be fixed to or formed by or mounted to or mounted in a machine head 21 that has a deployed position in which outlet 20 is located above the receptacle placing area and a collapsed position in which outlet 20 is retracted within an external machine main housing 1'. Machine head 21 may be driven inwards into and outwards out of the housing 1' by at least one of the first and second parts 11,12 or by an actuator controlled by the control unit.

Outlet 20 can be fixed to or formed by or mounted to or mounted in a movable beverage guide 22 that has a beverage dispensing configuration (FIG. 7) to dispense beverage 2 to the receptacle placing area and a beverage stop configuration (FIGS. 3 and 11) to prevent dispensing of beverage 2 to the receptacle placing area, e.g. by draining residual beverage 2 from guide 22 over a guide edge 23 to a waste receptacle 60. Guide 22 can be driven between the dispensing configuration and the stop configuration by at least one of first and second parts 11,12 or by a (or the above) machine head 21 or by an actuator controlled by the control unit.

Machine 1 incorporates a detection arrangement 30 for detecting the presence of such receptacle 4 in receptacle placing area. Detecting arrangement 30 can be connected to control unit 40. Detecting arrangement 30 may include a magnetic, electromagnetic, optical sensor (e.g. camera) or weight sensor.

Extracting unit 10 includes an actuator 13 configured to relatively move first and second parts 11,12 between their relatively distant and close positions. Actuator 13 is connected to control unit 40 and controlled thereby to relatively move first and second parts 11,12 when detecting arrangement 30 detects a presence of receptacle 4 in the receptacle placing area.

Control unit 40 may be connected to an input device for overriding or completing a control of the extracting unit 10 based on detecting arrangement 30, such as an input device comprising a user-interface 41 and/or a capsule sensor 151' for sensing a capsule 3 ready to be inserted into extracting unit 10.

Extraction unit 10 may include a capsule feeder 15 for feeding a capsule 3 to extraction chamber 10'. Feeder 15 can have a capsule dispenser 151 with a release configuration for releasing capsule 3 from feeder 15 towards extraction chamber 10' and a retain configuration for retaining capsule 3 away from extraction chamber 10'. Capsule feeder 15 can include a mechanical and/or magnetic capsule gate such as a capsule holder 151 e.g. matching at least part of an outer shape of capsule 3.

Figure 7:
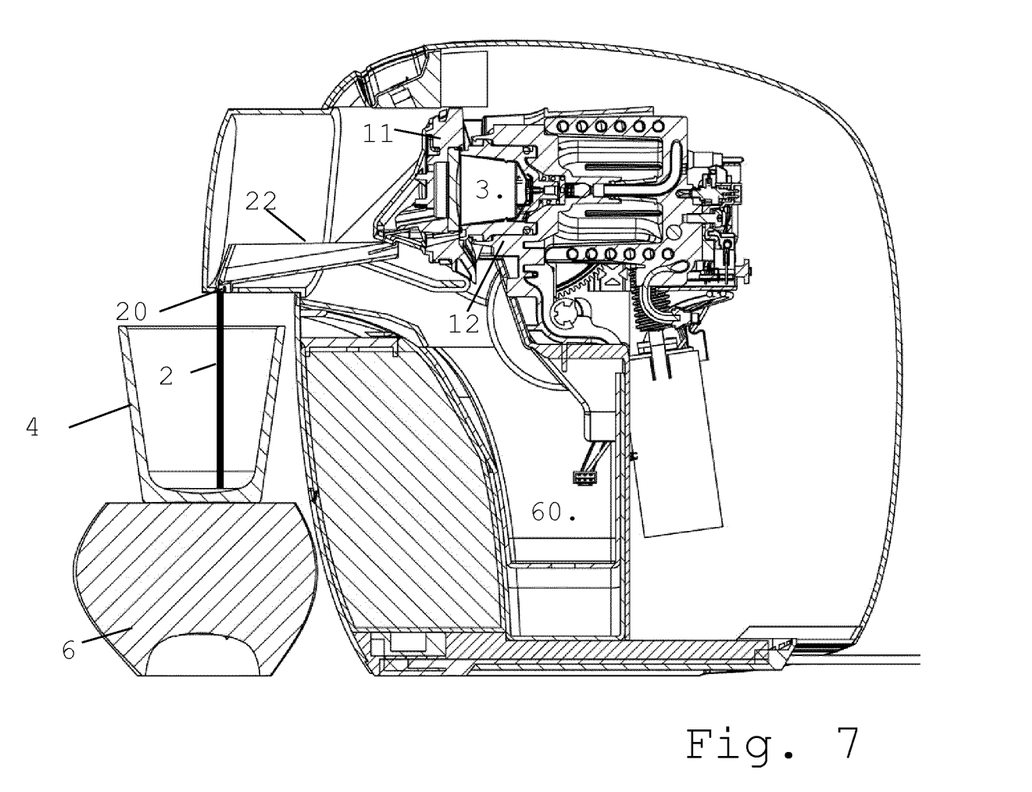
FIG. 7 illustrates the machine and capsule of FIG. 6, the first and second parts having being relatively moved into their close position to form the extraction chamber in which the capsule is housed, the liquid supplier supplying liquid into the extraction chamber to mix with a flavouring ingredient in the capsule and dispense it to the user-receptacle via the outlet.

Capsule feeder 15 can have a passage 152 (FIG. 5) for guiding capsule 3 to extraction chamber 10' into a predetermined capsule orientation for its entry into extraction chamber 10', such as a passage 152 associated with a capsule immobilizer for immobilizing capsule 3 between first and second parts 11,12 in their distant position (FIG. 6) prior to relatively moving them into their close position (FIG. 7).

Control unit 40 may control capsule dispenser 151 to release such capsule 3 from feeder 15 when first and second parts 11,12 are in the distant position (FIG. 5) or moving towards the distant position for an entry of such capsule 3 into extraction chamber 10' when first and second parts 11,12 are brought back into their close position (FIG. 7).

Figure 9:
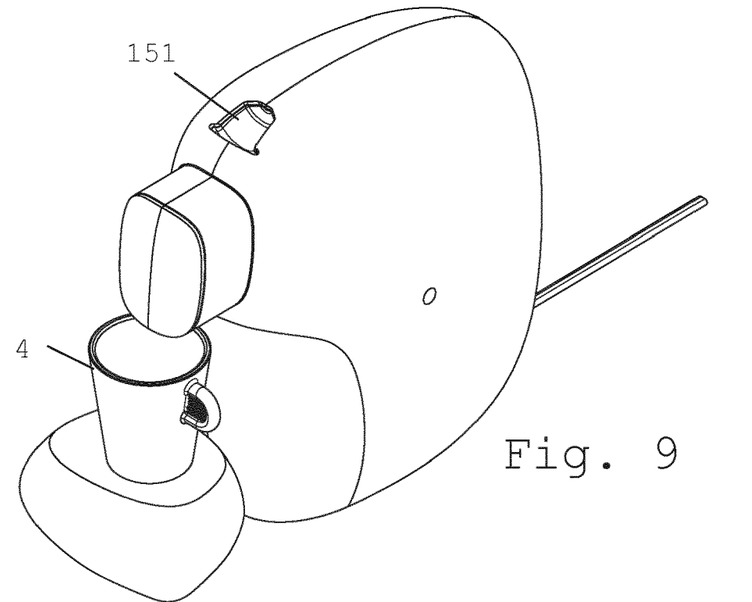
FIGS. 9 and 9a illustrate the machine of FIG. 1 without any non-extracted capsule, the first and second parts having been brought from their relatively close position into their relatively distant position upon detection of the user-receptacle.
Figure 9A:
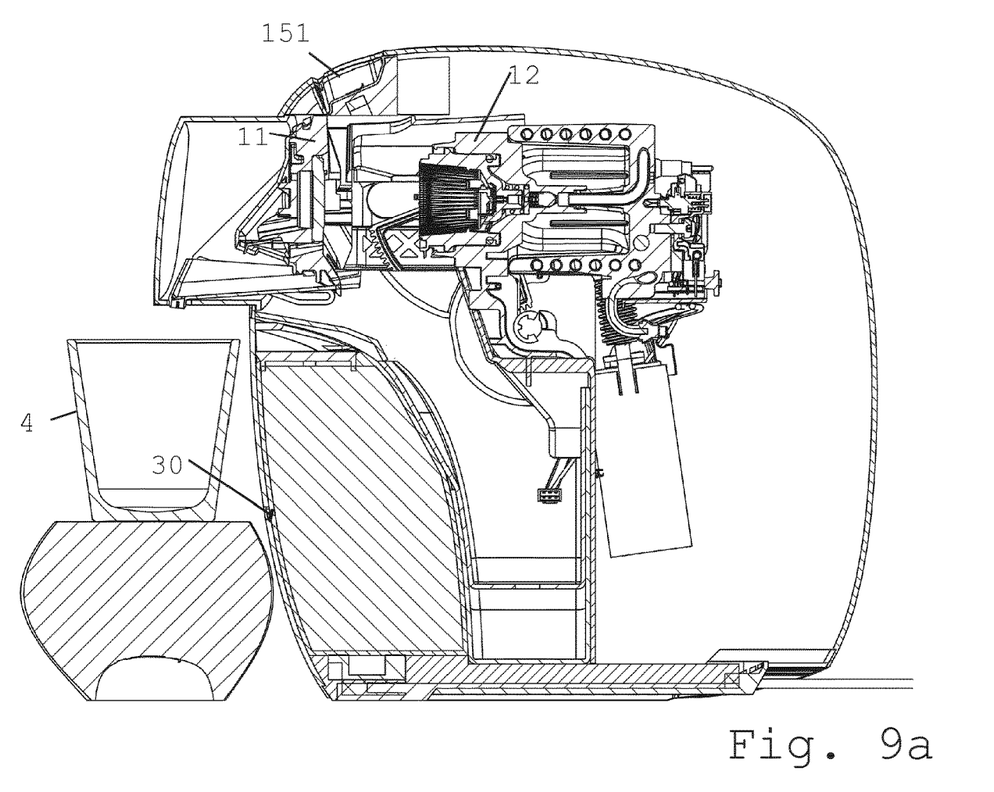
Figure 10:
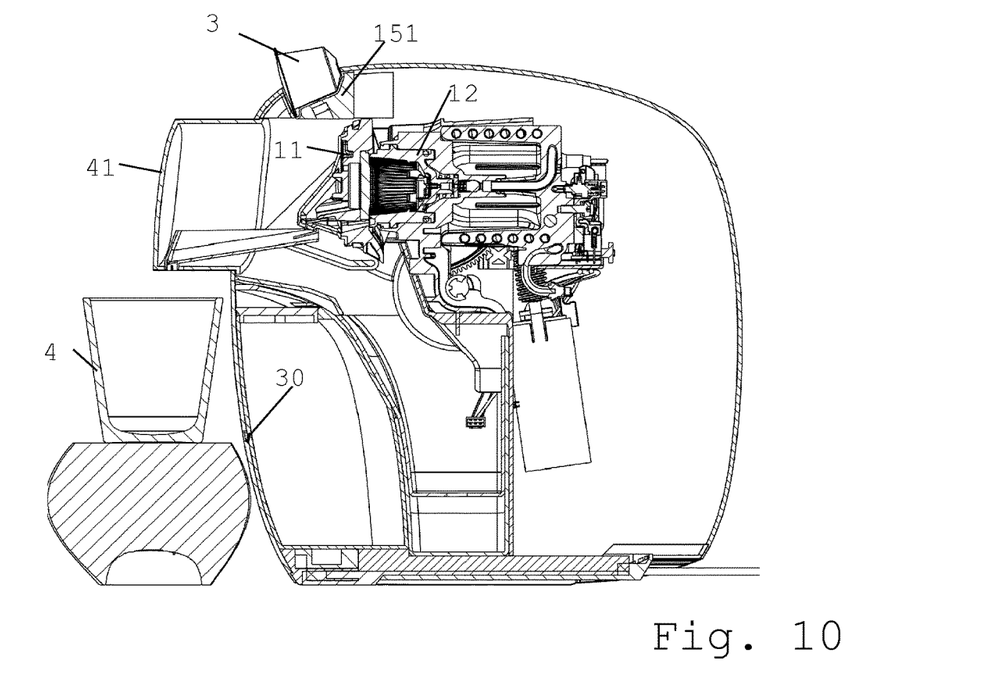
FIG. 10 illustrates the machine of FIG. 9a in which a non-extracted capsule has been placed on the capsule feeder too late to be supplied towards the extraction chamber before the first and second parts have been brought from their relatively distant position into their relatively close position.
Figure 11:
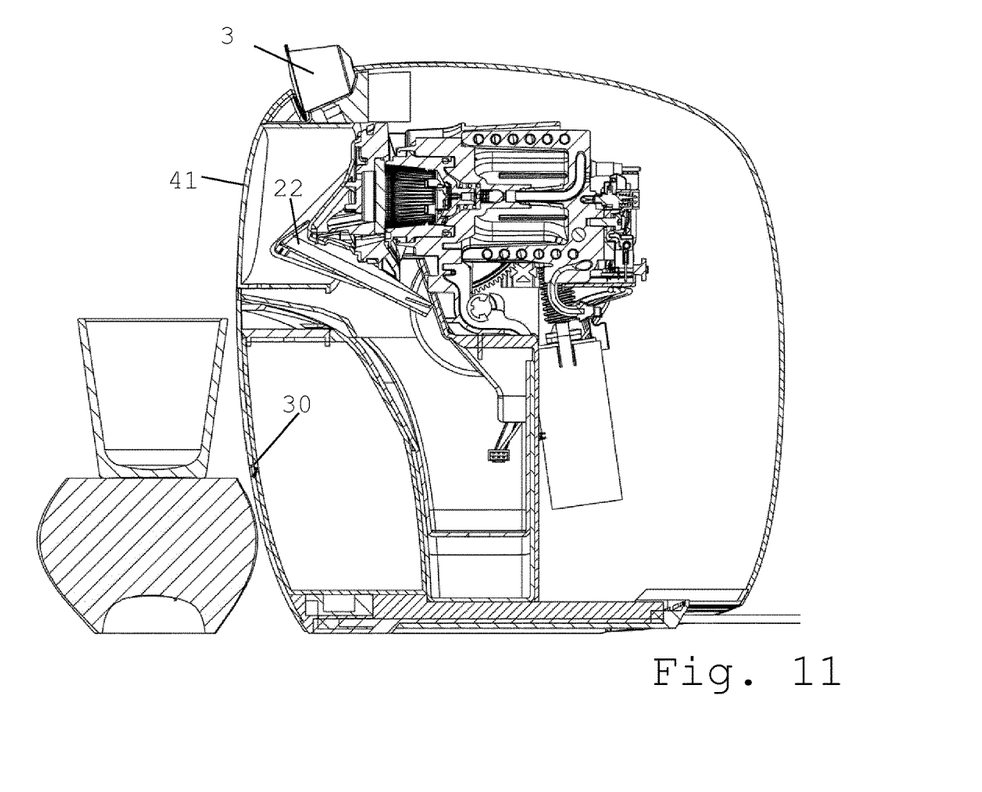
FIG. 11 shows the machine and capsule of FIG. 10 that is allowed to go into a stand-by configuration without extracting the capsule.

Control unit 40 may control capsule dispenser 151 to retain such capsule 3 at feeder 15 and away from extraction chamber 10' when first and second parts 11,12 are: in the close position or relatively moving thereto (FIGS. 2, 3, 10 and 11); or in the distant position and about to relatively move to the close position so as to leave insufficient time for such capsule 3, if it were released from dispenser 151, to be received into extraction chamber 10' prior to first and second parts 11,12 reaching the close position (FIGS. 9a and 10).

Figure 8A:
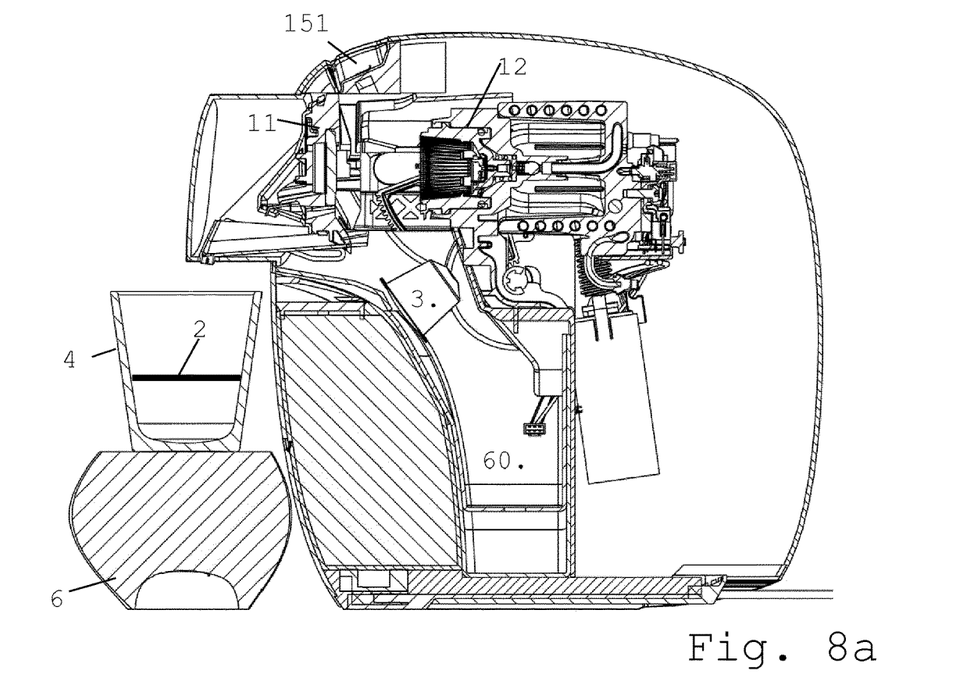
FIG. 8a shows the machine and capsule of FIG. 7 after extraction of the capsule and after relatively moving the first and second parts into their distant position, the capsule being ejected into a waste collector and no new capsule being fed towards the machine's extraction chamber.
Figure 8B:
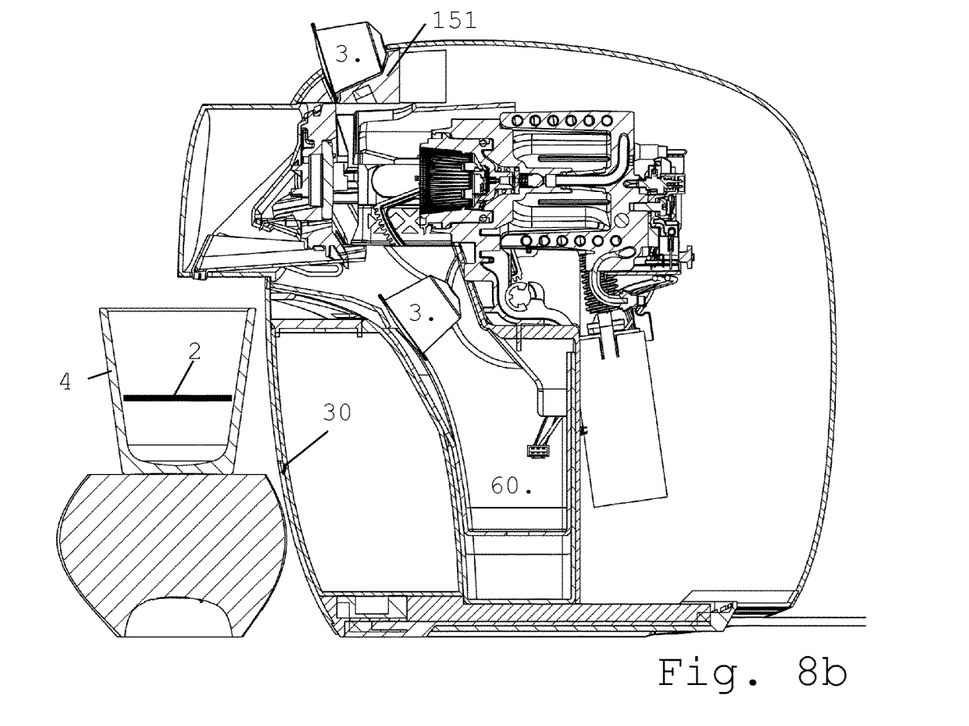
FIG. 8b illustrates a variation of the machine and capsule of FIG. 8a in which a new capsule is fed towards the machine's extraction chamber at the ejection of an extracted capsule.

Capsule feeder 15 may include or be associated with a capsule sensor 151' (FIG. 4) connected to control unit 40 that is configured to bring or maintain capsule dispenser 151 in its retain configuration when capsule sensor 151' senses no such capsule 3 on or at the capsule dispenser 151 (FIG. 8a).

Figure 3:
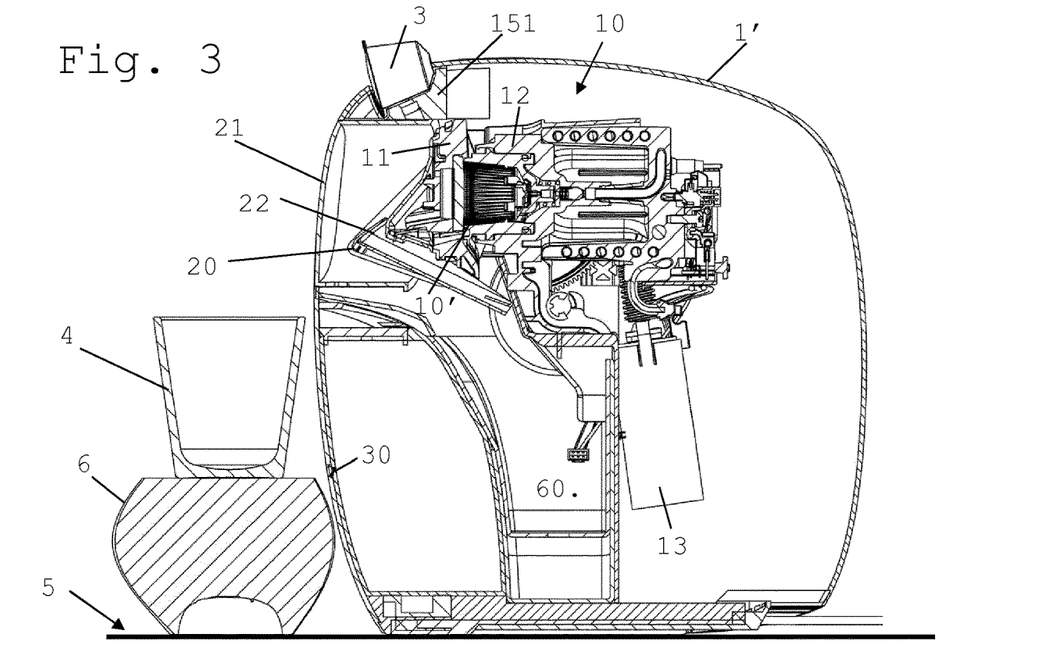
FIG. 3 is a cross-sectional view of the machine and capsule shown in FIG. 2 with a user-receptacle that is being detected by the machine.
Figure 4:
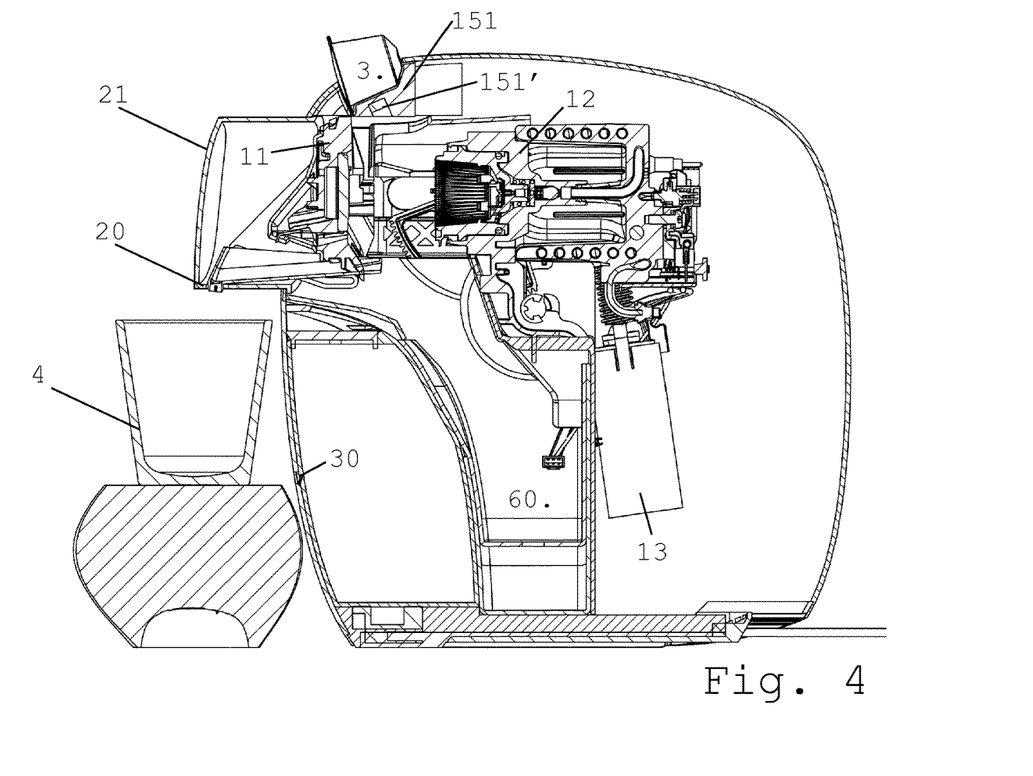
FIG. 4 illustrates the machine and capsule shown in FIG. 3 with the first and second parts that have been brought from their relatively close into their relatively distant position upon detection of the user-receptacle.
Figure 5:
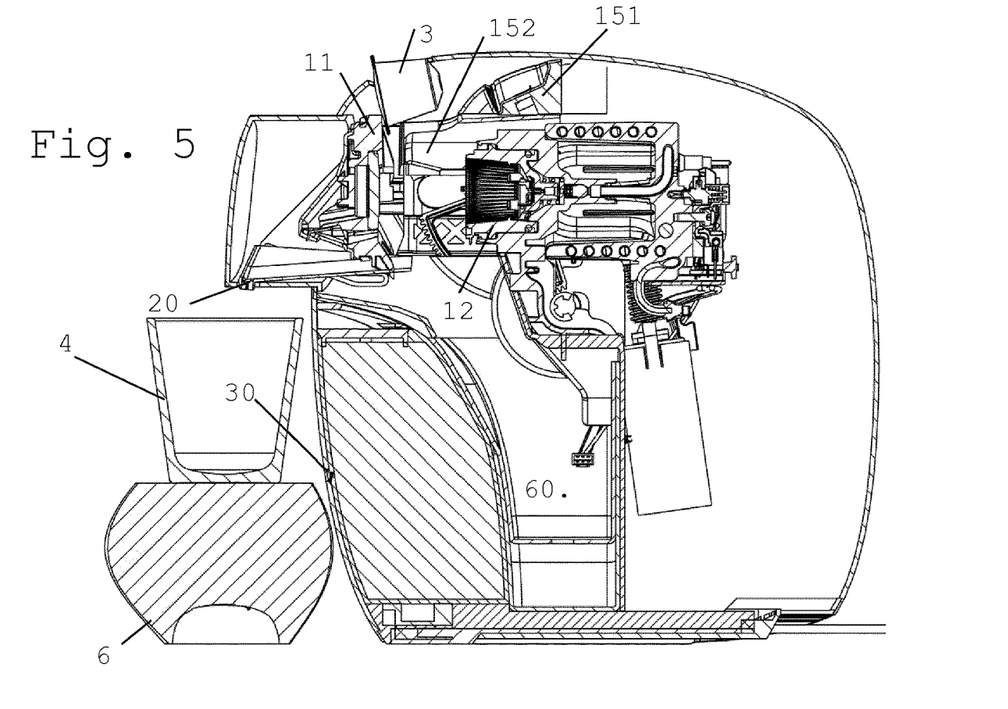
FIG. 5 is a cross-sectional view of the machine and capsule of FIG. 4, the capsule having been released towards the extraction chamber.
Figure 6:
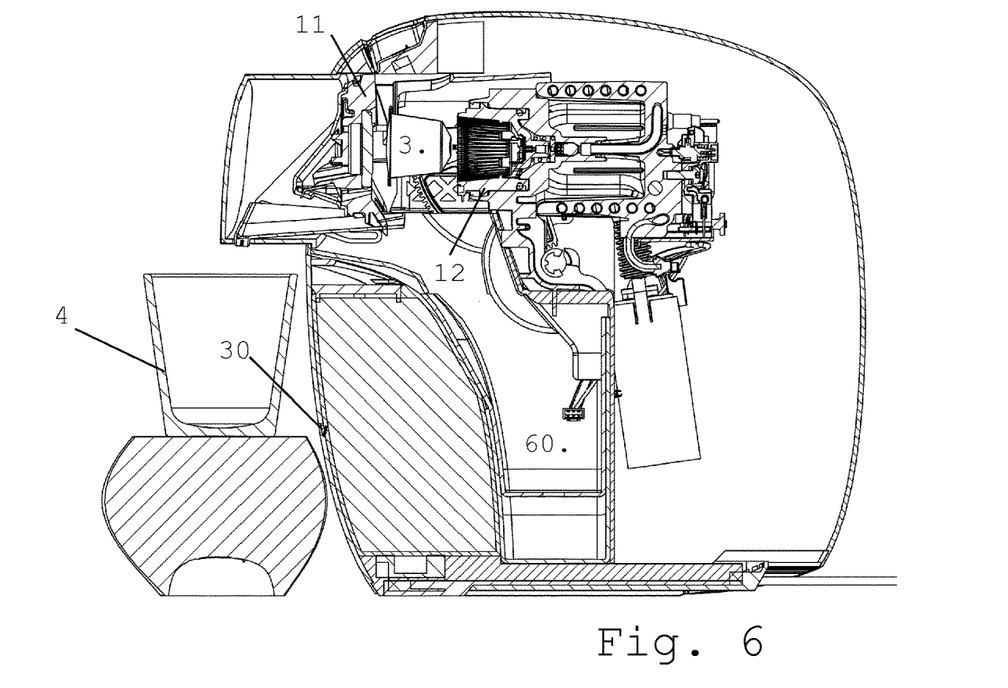
FIG. 6 illustrates the machine and capsule of FIG. 5, the released capsule having been immobilized between the first and second parts in their distant position.

Control unit 40 may be configured to control actuator so that first and second parts 11,12 are moved by actuator 13 from the close position into the distant position when detection arrangement 30 detects a placement of receptacle 4 into the receptacle placing area (FIGS. 3 and 4).

Control unit 40 may be configured to control actuator 13 so that first and second parts 11,12 are moved by actuator 13 from the distant position into the close position after a predetermined period of time has lapsed starting from: detecting the placement of receptacle 4; or reaching the distant position (FIGS. 3 to 7 and FIGS. 9 to 11). For instance, the predetermined period of time is in the range of 3 to 15 sec, such as 5 to 12 sec, e.g. 7 to 10 sec.

Figure 1:
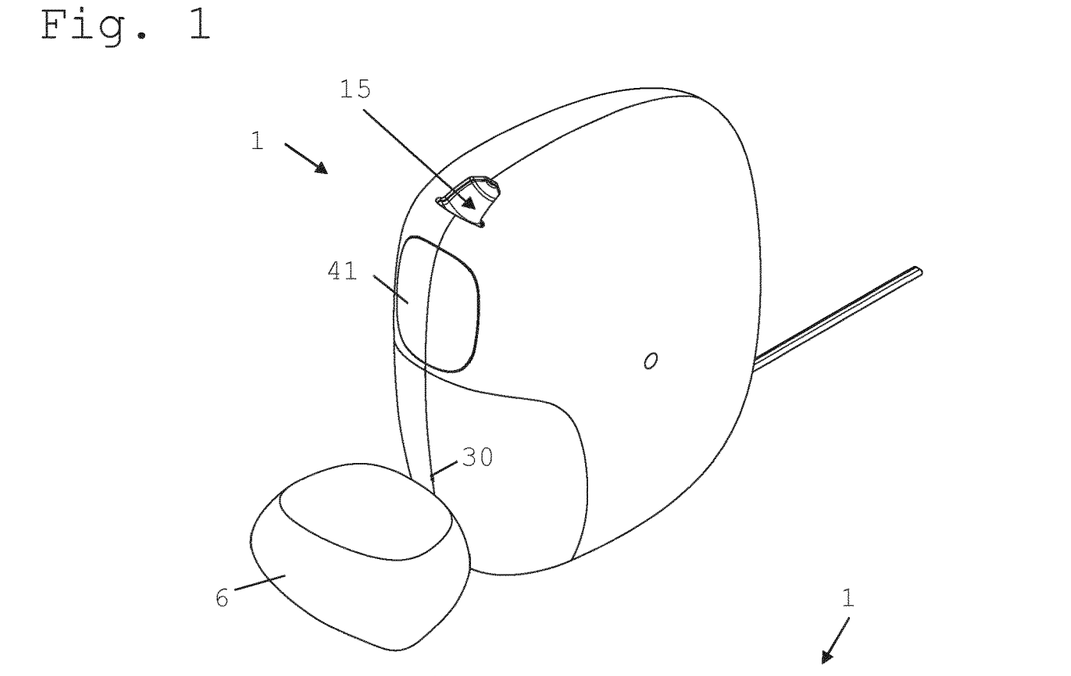
FIG. 1 is a perspective view of a machine according to the invention.
Figure 2:
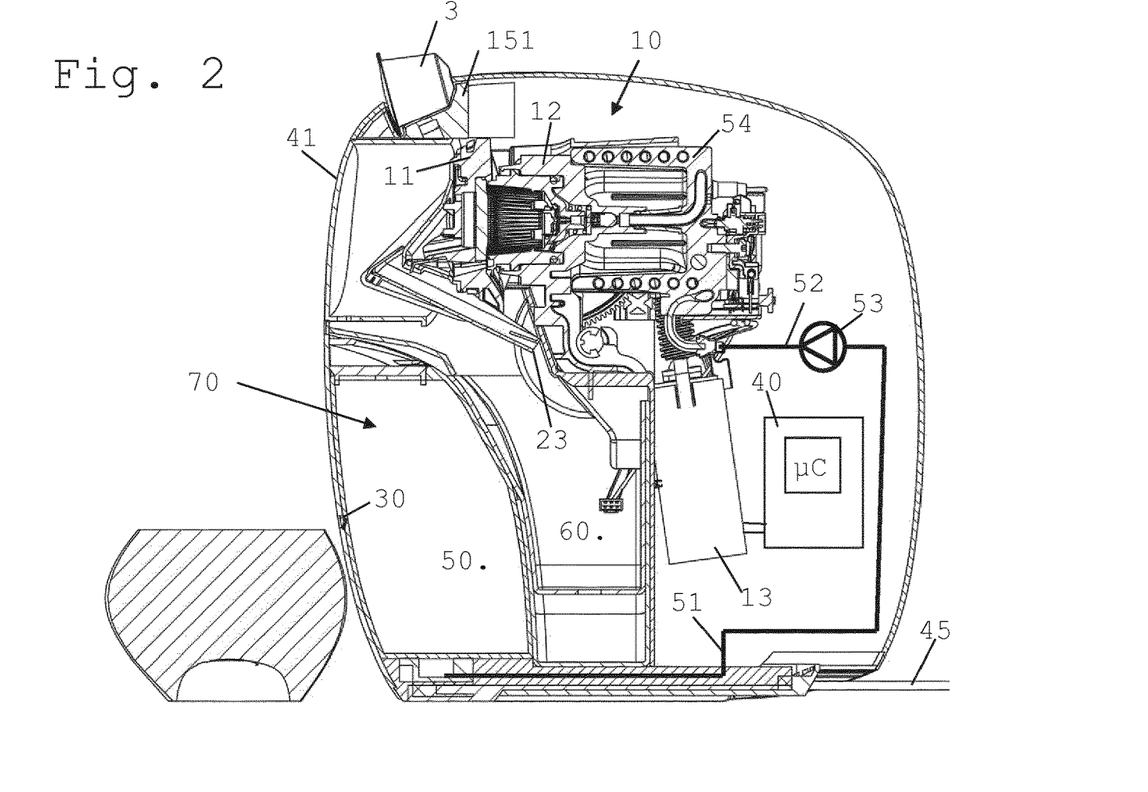
FIG. 2 is a cross-sectional view of the machine shown in FIG. 1 with a capsule to be fed towards the machine's extraction chamber.

Unit 10 may include a liquid supplier 50,51,52,53,54 for supplying liquid, e.g. water, into extraction chamber 10' (FIG. 2). Liquid supplier 50,51,52,53,54 can be connected to and controlled by control unit 40 to supply liquid into extraction chamber 10' and to interrupt such supply, automatically and/or manually via a user-interface 41 connected to control unit 40 and/or when a removal of receptacle 4 is detected by detecting arrangement 30.

For instance, liquid supplier 50,51,52,53,54 includes one or more of: a source of liquid 50, such as a liquid tank or a liquid connector for connection to an external liquid provider; one or more liquid tubes 51,52 for guiding the liquid to extraction chamber 10'; a liquid driver 53, such as a pump, for driving the liquid into extraction chamber 10'; and a thermal conditioner 54, e.g. a heater and/or a cooler, such as an inline thermal conditioner, e.g. an inline flow conditioner, for thermally conditioning the liquid.

Control unit 40 can be configured to control liquid supplier 50,51,52,53,54 to supply automatically the liquid into extraction chamber 10' when first and second parts 11,12 have reached their close position with capsule 3 housed in extraction chamber 10' upon moving parts 11,12 from the distant to the close positions so as to combine the liquid with an ingredient contained in capsule 3 and form beverage 2 for dispensing via outlet 20, optionally after sensing with a (or the above) capsule sensor 151' a supply of capsule 3 to unit 10. See FIG. 7.

Control unit 40 may be configured to control liquid supplier 50,51,52,53,54 to supply automatically the liquid into extraction chamber 10' when the first and second parts 11,12 have reached their close position without any capsule 3 housed in extraction chamber 10' so as to rinse or clean at least part of unit 10 and optionally outlet 20. For instance, liquid supplier 50,51,52,53,54 is configured to supply liquid at a rinsing or cleaning temperature that is different to the temperature of such liquid for forming a beverage, e.g. by brewing.

In a particular embodiment, it is also contemplated to deliver cold or cooled beverages.

Control unit 40 can be configured to control liquid supplier 50,51,52,53,54 not to supply automatically liquid into extraction chamber 10' when first and second parts 11,12 have reached their close position without any capsule 3 housed in the extraction chamber 10' (FIG. 10). For instance, control unit 40 is configured to control liquid supplier 50,51,52,53,54 to supply the liquid into extraction chamber 10' upon sensing a corresponding manual user-input on a user-interface 41 connected to control unit 40.

Machine 1 may include a (or the above) capsule sensor 151' connected to control unit 40 and configured for sensing a type of a capsule 3 fed to extraction chamber 10'. Control unit 40 can be configured to control liquid supplier 50,51, 52,53,54 according to a liquid supply program associated with the type, such as a liquid supply program with one or more adjusted supplied liquid parameters selected from a liquid temperature, flow, pressure and volume that is/are constant or variable during an extraction of capsule 3. For instance, the type can be selected from a plurality of capsule types extractible in extraction chamber 10' and associated with a type-dedicated identifier stored in an internal or external data storage means connected or connectable with control unit 40.

Control unit 40 may have an end-of-extraction management program which is run automatically when the liquid supply is interrupted (e.g. when a predetermined extraction process is over or is detected as faulty) to:
immediately relatively move first and second parts 11,12 into their distant position so as to remove any capsule 3 from inbetween the first and second parts 11,12; or
to maintain first and second parts 11,12 in the close position during a predetermined period of time, e.g. in the range of 1 to 5 sec such as 2 to 3 sec, for allowing a manual request, e.g. via a user-interface connected to control unit 40, to supply via the liquid supplier 50,51, 52,53,54 an additional amount of liquid into extraction chamber 10' and, in the absence of such manual request during said predetermined period of time, to relatively move first and second parts 11,12 into their distant position so as to remove any capsule 3 from inbetween first and second parts 11,12, for instance to remove such capsule 3 into a used-capsule collector 60 formed by a (or the above) waste receptacle 60.

Optionally, prior to moving first and second parts 11,12 into their close position, parts 11,12 may remain into their distant position for a predetermined period of time, such as a period of time in the range of 1 to 6 sec. e.g. 2 to 4 sec, for allowing an insertion of a new capsule 3 inbetween first and second parts 11,12 prior to relatively moving them into their close position with new capsule 3 housed in extraction chamber 10' for an extraction of new capsule 3.

Control unit 40 can be connected to at least one component, e.g. receptacle detecting arrangement 30 and/or a (or the above) capsule sensor 151', in machine 1 by a wireless connection, such as a component that is assembled or fixed to a movable or removable part 70 of machine 1 (FIG. 2). For instance, such component can be: a (or the above) capsule gate 151; or first or second part 11,12; or a removable service unit 70, such as a service unit 70 having a used capsule collector and/or a (or the above) liquid tank 50.

During use, the following steps can be carried out (FIGS. 1 to 7):
placing receptacle 4 in the receptacle placing area and detecting receptacle 4 by detection arrangement 30;
relatively moving first and second parts 11,12 into their distant position automatically as a result of detecting receptacle 4;
supplying capsule 3 to extracting unit 10;
relatively moving first and second parts 11,12 into their close position to position capsule 3 in extraction chamber 10';
extracting capsule 3 in extraction chamber 10' to prepare beverage 2; and
dispensing prepared beverage 2 via outlet 20 to receptacle 4.

Capsule 3 is positioned in extraction chamber 10' by relatively moving first and second parts 11,12 into their close position after first and second parts 11,12 have been moved into their distant position automatically upon detection by the detection arrangement 30 of a receptacle 4 in the receptacle placing area.

The invention claimed is:

1. A machine for preparing and dispensing a beverage comprising:
an extracting unit configured for extracting a beverage ingredient capsule to form the beverage, the extracting unit having a first part and a second part that are relatively movable between a distant position configured for inserting and/or removing a beverage ingredient capsule and a close position configured for securing and extracting the beverage ingredient capsule;
a control unit configured for controlling the extracting unit to extract the beverage ingredient capsule; and
an outlet configured for dispensing the beverage formed by extracting the beverage ingredient capsule to a user-receptacle, the user-receptacle being located in a receptacle placing area, an external placement support on which such machine is located, or a machine support to collect the beverage;
the extracting unit comprises an actuator configured to relatively move the first part and the second part between the distant position and the close position, the actuator being connected to the control unit and controlled thereby to relatively move the first part and the second part when a detecting arrangement detects the user-receptacle in the receptacle placing area.

2. The machine of claim 1, wherein the extraction unit comprises a capsule feeder for feeding a beverage ingredient capsule to an extraction chamber, the capsule feeder having a capsule dispenser having a release configuration configured for releasing the beverage ingredient capsule from the capsule feeder towards the extraction chamber and a retain configuration configured for retaining the beverage ingredient capsule away from the extraction chamber.

3. The machine of claim 2, wherein the control unit controls the capsule dispenser to release the beverage ingredient capsule from the capsule feeder when the first part and the second part are in the distant position or moving towards the distant position for an entry of the beverage ingredient capsule into the extraction chamber when the first part and the second part are brought back into the close position.

4. The machine of claim 2, wherein the control unit controls the capsule dispenser to retain the beverage ingredient capsule at the capsule feeder and away from the extraction chamber when the first part and the second part are in the close position or relatively moving thereto or in the distant position and about to move to the close position so as to leave insufficient time for the beverage ingredient capsule, if it were released from the capsule dispenser, to be received into the extraction chamber prior to the first part and the second part reaching the close position.

5. The machine of claim 2, wherein the capsule feeder comprises or is associated with a capsule sensor connected to the control unit, the control unit being configured to bring or maintain the capsule dispenser in the retain configuration when the capsule sensor senses no such beverage ingredient capsule on or at the capsule dispenser.

6. The machine of claim 1, wherein the control unit is configured to control the actuator so that the first part and the second part are moved by the actuator:
from the close position into the distant position when the detection arrangement detects the user-receptacle in the receptacle placing area; and
from the distant position into the close position after a predetermined period of time has lapsed starting from detecting the user-receptacle or from reaching the distant position.

7. The machine of claim 1, wherein the unit comprises a liquid supplier for supplying liquid, the liquid supplier being connected to and controlled by the control unit to supply the liquid into the extraction chamber and to interrupt such supply, automatically and/or manually via a user-interface connected to the control unit and/or when a removal of the user-receptacle is detected by the detecting arrangement.

8. The machine of claim 7, wherein the control unit is configured to control the liquid supplier to supply automatically the liquid into the extraction chamber when:
the first part and the second part have reached the close position with the beverage ingredient capsule housed in the extraction chamber upon moving the first part and the second part from the distant position to the close position so as to combine the liquid with an ingredient contained in the beverage ingredient capsule and form the beverage for dispensing via the outlet; and/or
the first part and the second part have reached the close position without any beverage ingredient capsule housed in the extraction chamber so as to rinse or clean at least part of the extracting unit, the liquid supplier configured to supply the liquid at a rinsing or cleaning temperature that is different from a temperature of the liquid for forming the beverage.

9. The machine of claim 7, wherein the control unit is configured to control the liquid supplier to not supply automatically the liquid into the extraction chamber when the first part and the second part have reached the close position without any beverage ingredient capsule housed in the extraction chamber.

10. The machine of claim 7, which comprises a capsule sensor connected to the control unit and configured for sensing a type of a beverage ingredient capsule fed to the extraction chamber, the control unit being configured to control the liquid supplier according to a liquid supply program associated with the type.

11. The machine of claim 7, wherein the control unit has an end-of-extraction management program which is run automatically when the liquid supply is interrupted to:
immediately relatively move the first part and the second part into the distant position so as to remove any beverage ingredient capsule from inbetween the first part and the second part; or
to maintain the first part and the second part in the close position during a predetermined period of time for allowing a manual request to supply via the liquid supplier an additional amount of liquid into the extraction chamber and, in the absence of such manual request during the predetermined period of time, to relatively move the first part and the second part into the distant position so as to remove any beverage ingredient capsule from inbetween the first part and the second part.

12. The machine of claim 1, wherein the control unit is connected to at least one component and/or a capsule sensor in the machine by a wireless connection.

13. A combination of a machine for preparing and dispensing a beverage comprising an extracting unit for extracting a beverage ingredient capsule to form the beverage, the extracting unit having a first part and a second part that are relatively movable between a distant position configured for inserting and/or removing a beverage ingredient capsule and a close position configured for securing and extracting the beverage ingredient capsule; a control unit configured for controlling the extracting unit to extract the beverage ingredient capsule; an outlet configured for dispensing the beverage formed by extracting the beverage ingredient capsule to a user-receptacle located in a receptacle placing area, an external placement support on which the machine is located, or a machine support to collect the beverage; the extracting unit comprises an actuator configured to relatively move the first part and the second part between a distant position and a close position, the actuator being connected to the control unit and controlled thereby to relatively move the first part and the second part when the detecting arrangement detects the user-receptacle in the receptacle placing area; and the beverage ingredient capsule.

14. A method of preparing and dispensing a beverage from a capsule in a machine for preparing and dispensing a beverage comprising a unit for extracting a beverage ingredient capsule to form the beverage, the unit having a first part and a second part that are relatively movable between a distant position for inserting and/or removing a capsule and a close position, for securing and extracting the capsule, a control unit for controlling the extracting unit to extract the capsule; an outlet for dispensing the beverage formed by extracting the capsule to a user-receptacle, located in a receptacle placing area, an external placement support on which such machine is located or a machine support to collect the beverage, the extracting unit comprises an actuator configured to relatively move the first and second parts between their relatively distant position and their relatively close position, the actuator being connected to the control unit and controlled thereby to relatively move the first and the second parts when the detecting arrangement detects the presence of the receptacle in the receptacle placing area, comprising: placing a receptacle in the receptacle placing area and detecting the receptacle by the detection arrangement; relatively moving the first and second parts into their distant position automatically as a result of detecting the receptacle; supplying the capsule to the extracting unit; relatively moving the first and second parts into their close position to position the capsule in the extraction chamber; extracting the capsule in the extraction chamber to prepare the beverage; and dispensing the prepared beverage via the outlet to the receptacle.

15. The machine of claim 1, wherein the control unit is connected to an input device for overriding or completing a control of the extracting unit based on the detecting arrangement.

16. The machine of claim 15, wherein the input device comprises a user-interface and/or a capsule sensor for sensing a capsule ready to be inserted into the extracting unit.

* * * * *